(12) United States Patent
Dille et al.

(10) Patent No.: US 12,274,200 B2
(45) Date of Patent: Apr. 15, 2025

(54) SEED ORIENTATION SYSTEM FOR AGRICULTURAL PLANTERS

(71) Applicant: Precision Planting LLC, Tremont, IL (US)

(72) Inventors: Mitchell R. Dille, Litchfield, MN (US); Keith T. Strang, Zimmerman, MN (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 18/359,046

(22) Filed: Jul. 26, 2023

(65) Prior Publication Data

US 2024/0016078 A1    Jan. 18, 2024

Related U.S. Application Data

(62) Division of application No. 16/870,548, filed on May 8, 2020, now Pat. No. 11,751,501.

(60) Provisional application No. 62/885,965, filed on Aug. 13, 2019, provisional application No. 62/845,093, filed on May 8, 2019.

(51) Int. Cl.
*A01C 7/08* (2006.01)
*A01C 5/06* (2006.01)

(52) U.S. Cl.
CPC .............. *A01C 7/082* (2013.01); *A01C 5/062* (2013.01)

(58) Field of Classification Search
CPC ......... A01C 7/082; A01C 5/062; A01C 7/081; A01C 7/08; A01C 7/00; A01C 5/06; A01C 5/00
See application file for complete search history.

(56) References Cited

U.S. PATENT DOCUMENTS

| | | | |
|---|---|---|---|
| 2,618,373 A | 11/1952 | Hathaway |
| 2,783,918 A | 3/1957 | Bramblett |
| 2,935,957 A | 5/1960 | Denton |
| 3,134,346 A | 5/1964 | Mann |
| 3,195,485 A | 7/1965 | Reynolds |
| 3,217,674 A | 11/1965 | Williams |
| 3,482,735 A | 12/1969 | Goulter |
| 3,623,595 A | 11/1971 | Brown et al. |
| 3,636,897 A | 1/1972 | Brink |

(Continued)

FOREIGN PATENT DOCUMENTS

| | | |
|---|---|---|
| CA | 2876661 A1 | 12/2013 |
| CN | 101663935 B | 10/2012 |

(Continued)

OTHER PUBLICATIONS

International Search Report and Written Opinion from PCT Application PCT/US20/32185, dated Oct. 30, 2020, 12 pages.

*Primary Examiner* — Christopher J. Novosad

(57) ABSTRACT

A seed orientation system for an agricultural planter includes a seed orientation coil assembly defining a helical pathway. As seed from a seed source enters the seed orientation coil assembly, air flow from an air source is directed toward the seed causing the seed to orient as the seed moves along the helical pathway toward a seed exit. Upon exiting the seed orientation coil assembly, the seed is deposited into the seed furrow with the seed tip-down and with germ of the seed facing an adjacent row. The seed orientation system may be retrofitted onto existing planter row units.

9 Claims, 8 Drawing Sheets

(56) References Cited

U.S. PATENT DOCUMENTS

| | | |
|---|---|---|
| 3,790,026 A | 2/1974 | Neumeister |
| 3,848,552 A | 11/1974 | Erickson et al. |
| 3,860,146 A | 1/1975 | Bauman et al. |
| 3,881,631 A | 5/1975 | Loesch et al. |
| 3,891,120 A | 6/1975 | Loesch et al. |
| 4,798,151 A * | 1/1989 | Rodrigues, Jr. ........ A01C 5/062 111/80 |
| 5,082,141 A | 1/1992 | Martin et al. |
| 5,524,559 A | 6/1996 | Davidson |
| 5,601,209 A | 2/1997 | Barsi et al. |
| 5,603,269 A | 2/1997 | Bassett |
| 5,974,988 A | 11/1999 | Stufflebeam et al. |
| 6,148,748 A | 11/2000 | Bardi et al. |
| 6,178,901 B1 | 1/2001 | Anderson |
| 6,332,413 B1 | 12/2001 | Stufflebeanm et al. |
| 6,827,029 B1 | 12/2004 | Wendte |
| 7,270,064 B2 | 9/2007 | Kjelsson et al. |
| 7,426,894 B2 | 9/2008 | Peterson et al. |
| 7,509,915 B2 | 3/2009 | Memory |
| 7,735,626 B2 | 6/2010 | Cope et al. |
| 7,814,849 B1 | 10/2010 | McOmber |
| 7,997,415 B2 | 8/2011 | Mongan et al. |
| 8,245,439 B2 | 8/2012 | Deppermann et al. |
| 8,286,387 B2 | 10/2012 | Becker et al. |
| 8,336,471 B2 | 12/2012 | Gilstring |
| 8,757,074 B2 | 6/2014 | Cruson |
| 8,789,482 B2 | 7/2014 | Garner et al. |
| 9,591,798 B2 | 3/2017 | Horsch |
| 9,861,025 B2 | 1/2018 | Schaefer et al. |
| 9,924,629 B2 | 3/2018 | Batcheller et al. |
| 10,412,879 B2 | 9/2019 | Cruson |
| 10,785,905 B2 | 9/2020 | Stoller et al. |
| 10,952,366 B2 | 3/2021 | Rhodes et al. |
| 2006/0278726 A1 | 12/2006 | Holly |
| 2015/0122162 A1* | 5/2015 | Horsch ................ A01C 7/042 111/200 |
| 2017/0181370 A1* | 6/2017 | Sheppard ................ A01C 7/06 |
| 2017/0245421 A1* | 8/2017 | Donolo ............ A01C 7/0443 |
| 2019/0230846 A1 | 8/2019 | Koch et al. |
| 2019/0289778 A1 | 9/2019 | Koch et al. |
| 2019/0289779 A1 | 9/2019 | Koch et al. |
| 2020/0128725 A1 | 4/2020 | Rhodes et al. |
| 2020/0187410 A1 | 6/2020 | Bredeweg |
| 2020/0367425 A1 | 11/2020 | Dille et al. |
| 2022/0087097 A1 | 3/2022 | Leifker et al. |
| 2022/0192079 A1 | 6/2022 | Dille et al. |

FOREIGN PATENT DOCUMENTS

| | | |
|---|---|---|
| CN | 102893723 B | 10/2014 |
| CN | 102918963 B | 12/2014 |
| CN | 103609227 B | 5/2016 |
| CN | 104938079 B | 8/2016 |
| CN | 104255130 B | 2/2017 |
| CN | 107439101 B | 4/2020 |
| CN | 107371486 B | 9/2022 |
| CN | 108207212 B | 1/2023 |
| DE | 102019127467 A1 | 4/2021 |
| EP | 2901832 B1 | 11/2017 |
| GB | 1530263 A | 10/1978 |
| WO | 2005117564 A1 | 12/2005 |
| WO | 2020227670 A2 | 11/2020 |
| WO | 2020247985 A1 | 12/2020 |
| WO | 2021155008 A1 | 8/2021 |

* cited by examiner

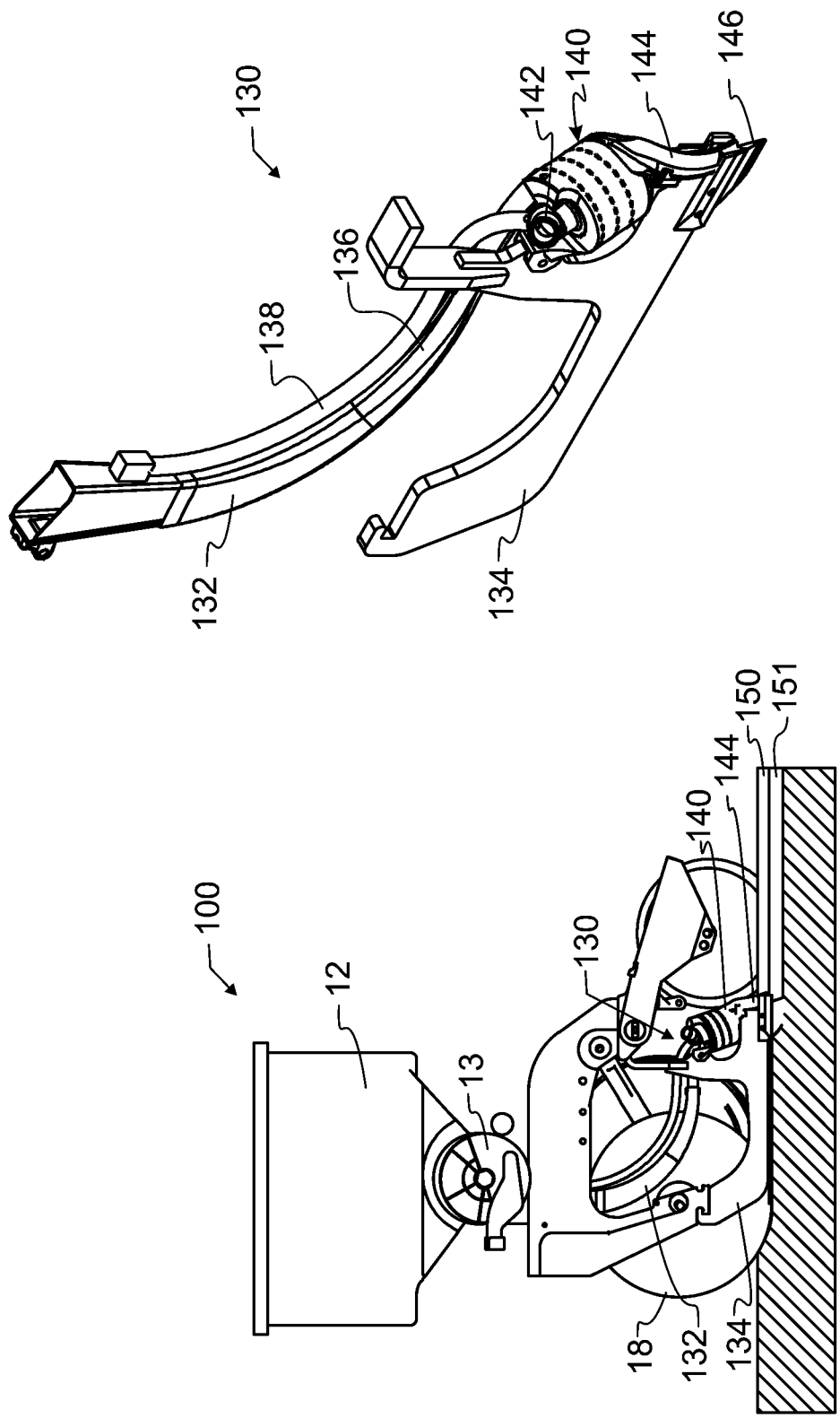

$F_A$ = Air Force (Air Drag on Seed from Air Jets)
$F_C$ = Centrifugal Force (Apparent Force)
$F_{SF}$ = Riding Surface Friction

SEED ORIENTATION SYSTEM FOR AGRICULTURAL PLANTERS

CROSS-REFERENCE TO RELATED APPLICATIONS

The present application is a divisional application of U.S. Ser. No. 16/870,548, filed May 8, 2020 and claims the benefit of U.S. Provisional Application No. 62/885,965 entitled "SEED ORIENTATION SYSTEM FOR AGRICULTURAL PLANTERS", filed Aug. 13, 2019, and U.S. Provisional Application No. 62/845,093 entitled "SEED ORIENTATION SYSTEM FOR AGRICULTURAL PLANTERS", filed May 8, 2019, all of which are incorporated herein by reference in their entirety.

TECHNICAL FIELD

The present invention relates to a seeding device for agricultural row crop planters and more specifically to a seed orientation system for placing seeds in the soil in an optimized growing orientation.

BACKGROUND OF THE INVENTION

Agricultural row crop planters typically include a seed hopper connected to a seed metering system that delivers seeds into a furrow formed by disc opener blades. The row crop planters are usually mounted in parallel along a tool bar which is attached to a tractor. There are typically multiple planting or row units disposed along the tool bar. For example, it is common to have 24 row units attached to a single tractor. The seeds are spaced in the ground through the metering system and seed tube. The metering system precisely singulates bulk seeds apart before dropping them into the ground, typically into a furrow cut by the opener blades. The typical row unit delivers seeds to the furrow without any attempt to maintain an orientation of the seed, or to control seed bouncing or tumbling.

In order to optimize field production efforts have been made to change the delivery of the seed. The standard method of seed delivery is a gravity drop system whereby a seed tube has an inlet positioned below the seed metering system. A singulated seed then drops from the metering system, down the seed tube and into a trench (furrow) prepared by opener blades disposed forward of the seed tube. This method can raise issues with seed placement, seed spacing, and relative velocity of the seed as it hits the ground.

Prior art methods for seed delivery improvement have focused on seed conveyors such as U.S. Pat. No. 8,789,482, "Seeding Machine with Seed Delivery System". Seed conveyors may include a brush belt that transports the seed from the seed metering system to the ground. This method moves the seed down to a discharge point closer to the ground and may accelerate the seed in a rearward direction thus eliminating much of the rolling of the seed in the trench (furrow). However, these types of methods do not orient the seed.

A number of mechanical systems have attempted to better optimize seed placement. US Patent Publication 2019/0230846 "Systems, Implements, and Methods For Seed Orientation With Adjustable Singulators During Planting," describes a seed disk with a vision system for determining seed orientation. An orientation mechanism is a disk which physically places each seed in a mechanical singulator and then through multiple orientation guides positions the seed for ground delivery. Operation of the orientation guides is controlled by the vision system. The mechanical aspects of how a seed is oriented is not included in the disclosure. Furthermore, the combination of the mechanical system with a vision system disposed close to the ground are expensive and prone to failure.

Recent studies have established the importance of orientating the seed in order to increase crop production. "The Effects of Planting Techniques on Maize Grain Yield and Silage Production," T. Kaufman, Illinois State University, Sep. 12, 2013, establishes that an optimal seed placement can improve yield by 14-19% for a given field. Optimal seed placement includes directing the seeds into the ground in a consistent position as ideally the yield potential is greatest when all of the seeds emerge from the soil within a given time frame. When some plants emerge earlier or later than the majority of the crop, the yield can be substantially reduced.

Optimizing seed orientation, tip down with germ facing adjacent row during planting results in a quicker and more even emergence, increased light interception, and faster canopy closure resulting in reduced weed pressure. When the tip of the seed is pointed down into the ground, the root and coleoptiles do not waste time and energy wrapping around the seed. Thus the crop has a quicker and more even emergence and greater stand uniformity.

There are further production advantages when the germ of the seed is orientated toward the next row. The leaf structure of corn plants aligns with the germ/embryo direction. When the germ is facing toward the next row, the leaves orient between rows and not over neighboring plants within the same row. As a result of optimized leaf structure there is greater light interception for the plant. Moreover, the optimized leaf structure provides a quicker canopy closure which preserves moisture and reduces weed pressure.

All these factors contribute to increased yield for the producer, however current seed planters do not have the ability to economically and efficiently orient a seed. This technology has been sought after since the beginning of modern agriculture. Although prior attempts have been made to geometrically orient seeds, none have succeeded. Thus there is a need for a seed orientation system that economically and efficiently places the seeds tip down and germ facing the next row in a furrow.

SUMMARY OF THE INVENTION

The present invention comprises a novel seed orientation system generally consisting of a geometrically optimized orienting device wherein air flow is used to orient the seed. An airflow parallel to the seed direction through a helical pathway creates a centrifugal force to maintain seed stability and location throughout transport. The parallel airflow to the seed direction within the helical pathway also serves to orient the seed in a tip first disposition. A transverse component of the airflow to the seed direction aids in locating the seed against the helical pathway. A novel capture/closing system is included to maintain the seed orientation when presented to the ground.

The complete system is intended to be mounted to an existing row unit on an existing agricultural planter between the existing furrow opener and row closers. The system can receive seed from the existing planter singulator meter in any orientation, orient the seed tip-down with germ facing across the row, then inject/plant the seed into the ground in said orientation. Orientated seed see better root growth and earlier/more even emergence. Moreover, corn leaves are orientated when seeds are planted with the germ facing adjacent rows. This effect maximizes sunlight and the crop reaches canopy more quickly, optimizing weed control and moisture conservation.

The components and terminology of the present invention are directed to a corn kernel. Although corn is the seed type presented, this benefit is not limited to only corn. In general, yield for fields of corn are optimized when the corn seed is tip-down with germ facing the adjacent row. The same benefits also apply to other crop types. It is envisioned that the present invention could increase production and yield for a variety of crops where seed orientation is important.

The present invention is a seed orientation system for use with an agricultural planting machine, the seed orientation system comprising: a seed collector for receiving seed from the agricultural planting machine; a seed transfer tube operably connected to the seed collector at a first end; a seed orientation coil assembly connected to a second end of the seed transfer tube, the seed orientation coil assembly defining a helical pathway from a seed entry aperture to an oriented seed exit aperture; and a sub-furrow opener disposed adjacent to the oriented seed exit aperture, said sub-furrow opener including a wedge to slice a mini furrow within a planter furrow.

The agricultural planting machine may be a row planter attached by various means to a tractor. The typical corn row planter includes a seed hopper for holding the bulk seed. The seed hopper includes an opening to direct the seed to a seed meter. Delivery of the seed may typically be by a vacuum method but other delivery methods are envisioned. The seed meter then attempts to singulate the seed and spaces the seed out for delivery into the ground. The metered seed then flows into a seed tube which transports the seed into a furrow. It is envisioned that the seed could come directly from a seed hopper if a meter is not required. One or more closing wheels then closes the furrow about the seed. The seed falls from the seed tube into the furrow in a random orientation in an uncontrolled manner.

In order to improve seed orientation, the present invention connects a seed orientation system to the existing seed tube. The seed orientation system includes a seed orientation support structure that includes one or more connection flanges so as to connect to the agricultural planting machine. The seed orientation support structure further includes support connections for the seed collector and the seed orientation coil assembly. The seed orientation support structure can include a mounting assembly for a sub-furrow opener. The seed orientation support structure also prevents soil and debris from entering the furrow from the opener wheels back to where the seed is inserted.

In another embodiment, the existing seed tube may be replaced in its entirety by a seed collector and a seed transfer tube. The seed pathway of the seed collector and the seed transfer tube will reduce the change of direction and tumbling imparted on the seed by using the existing seed tube. A seed orientation support structure will optionally provide support to the seed collector. The seed orientation support structure will include one or more connection flanges so as to connect to the agricultural planting machine. The seed collector and seed transfer tube may be connected at a first end to the row unit shank positioned at the seed meter exit and at a second end to a seed orientation coil assembly. The seed orientation support structure may further include support connections for the seed collector and the seed orientation coil assembly.

In one embodiment, the seed orientation system may include an air supply system. The air supply system may be independent or connected to an air system of the row unit, planter frame or the tractor. The air system may include connections to provide an air flow to the seed orientation coil assembly. The air system may also provide air to the seed collector and seed transfer tube when using an existing seed tube. The air system may further provide air to the seed collector in the embodiment where the seed tube is exchanged for a more efficient seed path. This feed path might be a dedicated air feed line that doesn't contact the injector core or may be from the injector core acting as a manifold.

The seed is next transported from the seed transfer tube to the seed orientation coil. The helical pathway of the seed orientation coil assembly is disposed within an outer coil, said outer coil including a central aperture in which an injector core is disposed. The pathway may be a curved shape as well. The injector core is a cylindrical structure defining an open central region. At a first end, the injector core is operably connected to an incoming air line. The incoming air feed at the top of the injector core is branched into two paths. The first path is to the seed collector, and the second path is to the injector core that feeds the nozzles. At a second end, the injector core is closed by an end wall. In alternative embodiments, the second end of the injector core may contain some venting. The incoming air feed is operably connected to a first end of the injector core, said injector core including an injector vent system disposed through an outer wall for the injector core. The injector vent system includes a plurality of vent holes or nozzles. The airflow from the nozzles hits the seed at an angle somewhere around 45 deg, which has a parallel and perpendicular component on the seed. The vent holes in a first embodiment are circular but may be of a variety of shapes, placement and angle about the injector core.

The outer coil includes an outer vent system disposed about an exterior wall of the outer coil. The helical pathway of the outer coil includes a seed riding surface that intersects a seed guide wall, said helical pathway further including a seed exit path. The seed riding surface profile is angled radially outward so as to direct the seed to an intersection area where the seed guide wall adjoins the seed riding surface. An alternate embodiment of the path profile could be circular or curved to locate the seed in the center of the curve. The helical pathway in a first embodiment includes at least three revolutions but embodiments with less or more than three revolutions are envisioned. An alternate embodiment could use a pathway that is not helical in shape, but curved, radial or a combination of radial shapes, or any pathway that can achieve a centrifugal force upon the seed. Alternatively, the air injector pattern and the seed path may be curved in shape, not using a helical pattern. Injectors may be singular or multiple along the curved path, following the curvature of the path. The vented outer coil preferably uses a smooth surface to slide a seed and to retain stability and orientation, preventing rotation and/or tumbling.

The vented outer coil helical pathway includes a seed entry aperture at a first end and the seed exit path at the second end. A series of nozzles direct airflow transverse from the injector core, across the pathway and out the air vents on the exterior wall of the outer coil.

Regarding seed positioning, the seed has two flat sides, one of which has the germ on it. Therefore, the germ will point out perpendicular from one of the flats on the seed. Since the seed rides on one of these flat sides along the seed path and is injected into the ground with these flat surfaces parallel to the planting row, the germ will always face perpendicularly into the area between rows instead of facing toward another seed in its current row. The benefit of this is the emerging corn plant will align its leaf structure into the rows vs. overlapping neighboring plants.

The exit path from the helical pathway includes a curved shape that continues the seed riding surface into the ground. The seed will have velocity from the helical path combined with the centrifugal force of the curved exit path so as to ride the curved exit path without altering its tip down orientation.

A sub-furrow opener is positioned below and forward of the exit path with respect to the direction of travel. The sub-furrow opener features a slicing wedge shape to form the soil so as to pinch/wedge the seed and maintain its orientation. It is envisioned in a first embodiment that the seed has sufficient downward velocity to be propelled into the sub-furrow. The seed is thus retained in an interference fit into the subsoil. It is envisioned that the shape of the wedge could be varied to also provide an interference fit. An alternate embodiment could use a closing wheel, disc, or blade positioned next to the seed to help capture the seed instead of fully relying on an interference fit or wedge.

The profile of the sub-furrow opener needs to taper down to allow seeds of all sizes to be captured. The profile also must have an extended bottom to prevent the seed tip from hitting the bottom of the sub-furrow and recoiling out before becoming wedge/taper locked. The angle of the exit path from the coil helps to reduce the seed/ground velocity delta. Preferably, at a typical 5 mph planting speed and what would be a 5 mph horizontal velocity delta, the seed velocity should be reduced to about 2 mph. At a slower 3 mph planting speed, the seed would be a dead drop into the sub-furrow; however, this speed is dependent on the horizontal component of the actual exit speed of the seed and will vary depending on overall system air availability.

The present invention is a seed orientation system for positioning a seed in a furrow, the seed orientation system comprising a seed orientation coil disposed so as to receive seeds from a planter, said seed orientation coil including a curved seed path, and a pressurized air system to direct a parallel air flow parallel to the curved path. Furthermore, the parallel airflow directs the seed into a seed tip down orientation on a flat side of the seed and propels the seed down the curved path to a seed exit path. The curved path may have a helical shape and the curved seed path may comprise a seed guide wall and a seed riding surface. The pressurized air system may include a plurality of nozzles to direct a radial airflow over the curved path and out a series of vents.

The present invention is a seed orientation system for delivering an oriented seed to a furrow, the seed orientation system comprising: a seed transfer assembly for receiving the seed from an agricultural planting machine and providing a pathway for the seed to a seed orientation coil assembly; a seed orientation coil assembly connected to the seed transfer assembly, the seed orientation coil assembly defining a curved pathway for the seed from a seed entry aperture to a seed exit aperture; and a sub-furrow opener disposed adjacent to the seed exit aperture, said sub-furrow opener including a wedge to slice a furrow below a planter furrow. The seed transfer assembly may include a seed collector or a seed transfer tube or other connection devices. The seed transfer assembly further includes a seed receiving aperture and an air line connection to provide air to the seed transfer assembly.

The present invention further includes a method for planting an oriented seed using a seed planter, the method comprising; positioning a seed orientation system on the seed planter, the seed orientation system operably positioned to receive a seed from the seed planter; connecting a high-flow pressurized air line to the system to a seed orientation coil assembly; connecting a seed collector air line from the seed orientation coil to a seed collector; propelling the seed from the seed collector through a seed transfer tube to the seed orientation coil assembly; feeding the seed into a vented outer coil of the seed orientation coil, said vented outer coil defining a helical pathway to a seed exit path, the vented outer coil including a plurality of air vents disposed radially about an outer wall of the vented outer coil; injecting pressurized air into an injector core of the seed orientation coil, said injector core including a plurality of air injectors disposed radially about an outer wall of the injector core; orientating the seed into position as air is flowing over the seed, said seed subjected to a centrifugal force as it is propelled through the helical pathway; holding the seed in a tip down orientation within the helical pathway; directing the seed to the seed exit path; and scoring a sub-furrow inside a main furrow that is used to capture or wedge the seed to retain its orientation and/or position.

The method further includes maintaining an airflow through the injector core and the vented outer coil so as to push the seed up the seed riding surface to the seed guide wall, with the assistance of centrifugal force induced on the seed as it travels its curved/helical pathway. The vented outer coil includes a seed riding surface and a seed guide wall. The seed riding surface is angled radially outward to where it intersects the seed guide wall. The air injectors of the injector core may be aligned radially with the air vents of the vented outer coil. The airflow from the injectors hit the seed at an angle, giving two main (pressure) force vector components on the seed. One component pushes parallel to the seed path and the other pushes perpendicular to the seed path. The parallel component of the airflow flows from behind the seed and over the seed, this both propels the seed forward and causes the seed to orient tip forward in the flow (as this orientation has the lowest stable aerodynamic cross section (lowest drag)). This parallel airflow component also increases the velocity of the seed which makes soil capture possible. The perpendicular component of the airflow, combined with centrifugal force, pushes the seed into the seed riding surface and guide wall to provide the stability needed to maintain the tip-forward orientation.

In an embodiment, the present invention is a method for planting a seed in an oriented position by using a seed orientation coil assembly. The seed orientation coil assembly includes a curved seed path and a plurality of nozzles directed to the curved path. The method comprises the steps of: propelling the seed from a seed hopper to the seed orientation coil assembly; directing the seed into a vented outer coil of the seed orientation coil assembly, said vented outer coil defining the curved seed path to a seed exit path, the vented outer coil including a plurality of air vents disposed radially about an outer wall of the vented outer coil; directing pressurized air into an injector core of the seed orientation coil, said injector core including the plurality of air injector nozzles disposed radially about an outer wall of the injector core, said nozzles directed radially at the seed on the curved path; orientating the seed into the orientated position by directing an air flow over the seed parallel to the seed path and transverse to the seed path, said seed subjected to a centrifugal force as it is propelled through the curved pathway; maintaining the seed in a seed tip forward orientation through contact with the curved pathway; and directing the seed to ride down the seed exit path with seed tip down and seed flat side pointed at an adjoining seed row.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 10 is a side elevational view of a planter row unit with an alternate embodiment seed collector.

FIG. 11 is a perspective view of the alternate embodiment seed collector.

Figure 1:
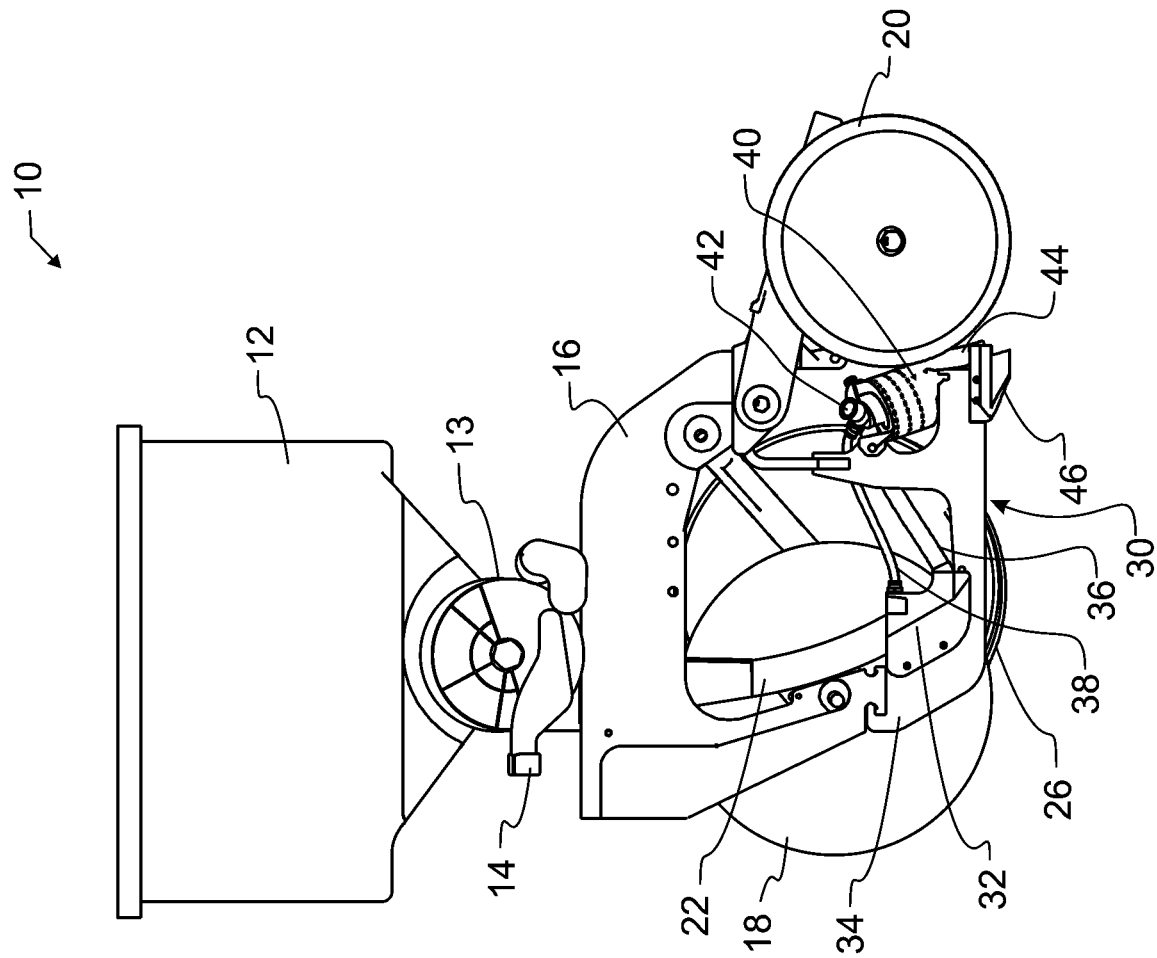
FIG. 1 illustrates a side elevation view of a first embodiment of the seed orientation system integrated into a planter row unit.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 illustrates a row unit 10 with the seed orientation system 30 of the present invention installed. Row unit 10 is an example of a commonly found planter unit designed for the purpose of delivering a seed into a furrow. Row unit 10 would typically be found mounted to a tool bar that attaches to a tractor or similar towing device along with other identical or similar planting row units. Row units can be found in even number groups from a few units to as many as forty-eight row units.

The typical row unit 10 includes seed hopper 12 for storing the seed for planting. The seed is directed by means to a seed meter 13. The seed meter 13 may use a conventional vacuum disk driven by a vacuum delivery line 14. The seed meter 13 acts to singulate the seed at a desired spacing for delivery to the ground. From the seed meter 13, the seed is delivered to the ground through seed tube 22.

A shank structure 16 provides the structural support for the seed hopper 12, seed meter 13 and the seed tube 22. Opener blade 18, a gauge wheel 26 and closing wheels 20 are also attached to the shank 16. The opener blade 18 forms a trench or furrow in the soil ahead of the seed tube 22. The gauge wheel 26 controls the depth of the furrow and the closing wheels 20 close the furrow over the seed.

In a first embodiment, seed orientation system 30 is mounted to the row unit 10. Seed orientation system 30 includes a seed collector 32 operably attached to the seed tube 22. The seed collector 32 gathers the seed and changes its direction by way of a seed transfer tube 36 to a seed orientation coil assembly 40. The seed passes through the helical path of the seed orientation coil assembly 40 to an oriented seed exit path 44. A sub-furrow opener 46 creates a wedge shaped trough within the furrow for capturing the oriented seed.

Movement of the seed throughout the seed orientation system 30 is aided by air from a central blower/fan. Air is first directed to system air infeed 42 disposed on the upper face of the seed orientation coil assembly 40. An air line 38 is then directed to seed collector 32 for moving the seed from the seed collector 32 to the seed orientation coil assembly 40.

A seed orientation support structure 34 provides structural support for seed collector 32, seed transfer tube 36, seed orientation coil assembly 40 and sub-furrow opener 46. The seed orientation support structure 34 may be connected to shank structure 16 at one or more locations. The seed orientation support structure 34 also acts to keep debris out of the furrow and to protect against rock impacts.

Figure 2:
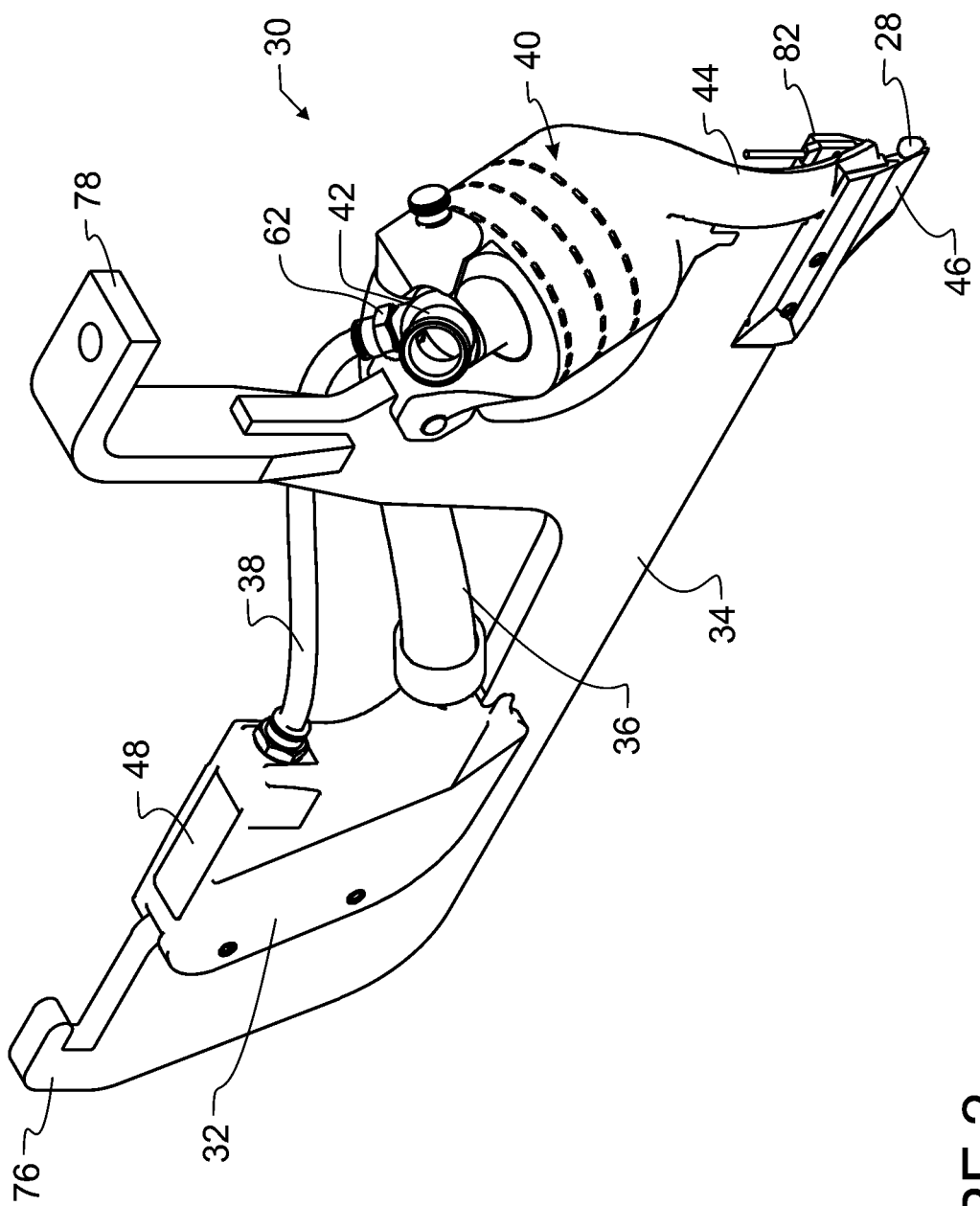
FIG. 2 is a perspective view of the first embodiment of the seed orientation system.
Figure 3:
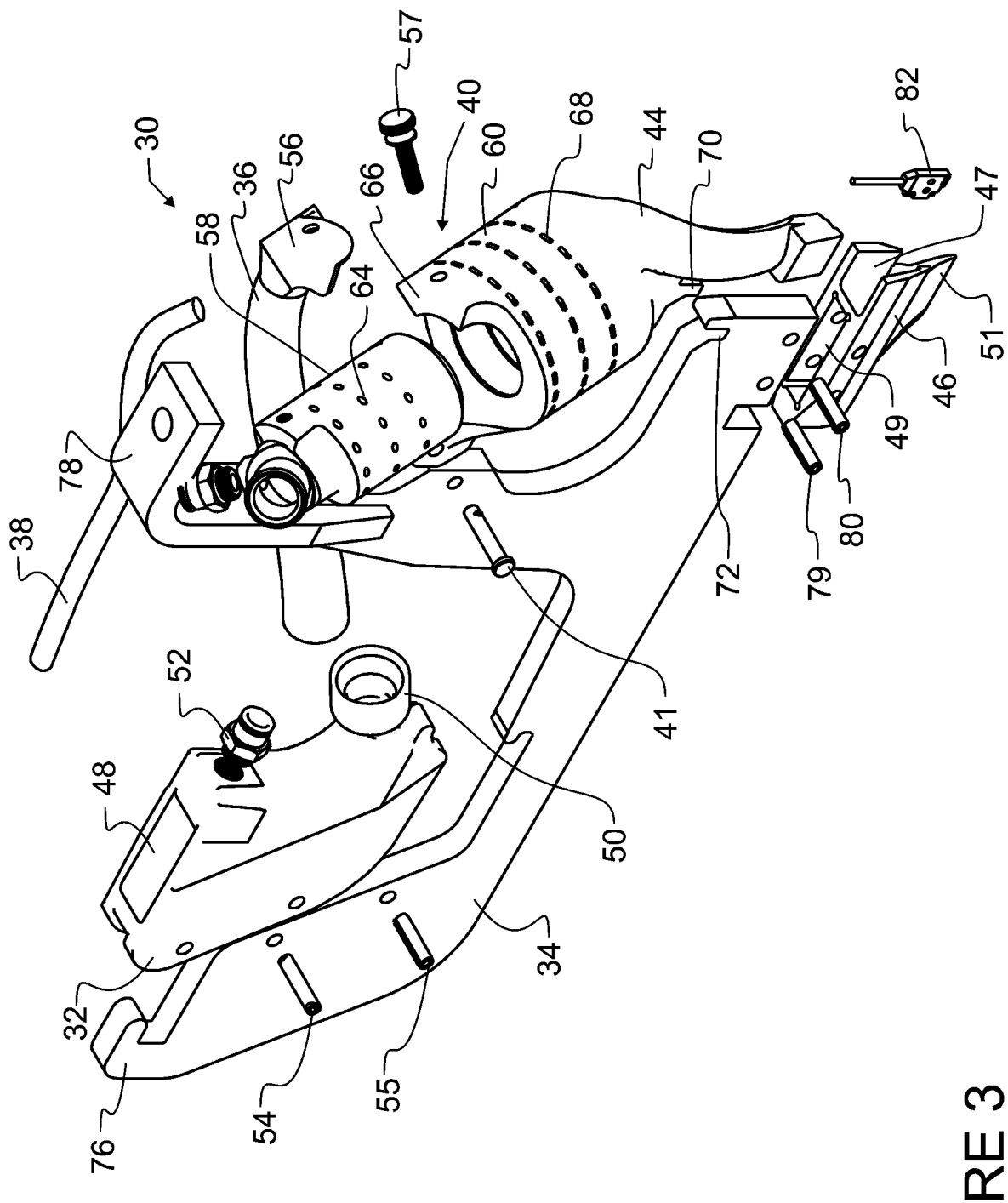
FIG. 3 is an exploded perspective view of the first embodiment of the seed orientation system.

FIGS. 2 and 3 depict the seed orientation system 30. Seed orientation system 30 includes a seed collector 32 that directs seeds from seed tube 22 to seed orientation coil assembly 40 by way of seed transfer tube 36. Seed collector 32 includes a seed entrance aperture 48 and a seed exit aperture 50. Seed entrance aperture 48 is sized to mate with the seed tube 22. An air line connection 52 is disposed adjacent to the seed entrance aperture. The seed collector 32 may include various indentations or flanges for connection to the seed orientation support structure 34, as well as pins 54 and 55.

Seed transfer tube 36 attaches to seed exit aperture 50 at a first end and to seed orientation coil 40 at a second end. It is envisioned that seed transfer tube 36 will include a mating flange 56 and a retaining pin 57 for connection to the seed orientation coil 40. Pin 41 retains the seed orientation coil assembly 40 relative to the support structure 34.

Seed orientation coil 40 includes an injector core 58 that resides within vented outer coil 60. The injector core 58 includes at a first end incoming air feed 42 and outgoing air feed 62 that provides air through air line 38 to air line connection 52 on the seed collector 32. Injector core 58 further includes a plurality of nozzles 64 arrayed in a helical pattern about the outer face of the injector core 58.

Vented outer coil 60 defines an aperture into which injector core 58 is operationally inserted. The vented outer coil 60 includes a seed entrance 66 that mates with flange 56 of the seed transfer tube 36. A plurality of vents 68 are disposed about the outer face of the vented outer coil 60. The vents 68 may have a variety of shapes including rectangular, circular, ellipsoid or other random shapes. The vents 68 do not have to be uniform in size or shape. At a second end of the vented outer coil 60, seed exit path 44 extends towards the ground. A seed sensor 82 may be attached to the vented outer coil 60 proximal to the exit path 44 so as to monitor seed flow.

Seed orientation support structure 34 connects to the row unit shank 16 through hook 76 and flange mount 78. It is envisioned that the geometry and location of such connection points can be altered depending on the structure of the row unit 10. The seed orientation support structure 34 supports the seed orientation coil 40 through flange 70 which extends from the second end of vented outer coil 60. The flange 70 mates within notch 72 of the seed orientation support structure 34. The sub-furrow opener 46 is connected to the seed orientation support structure 34 by roll pins 79 and 80.

Figure 4:
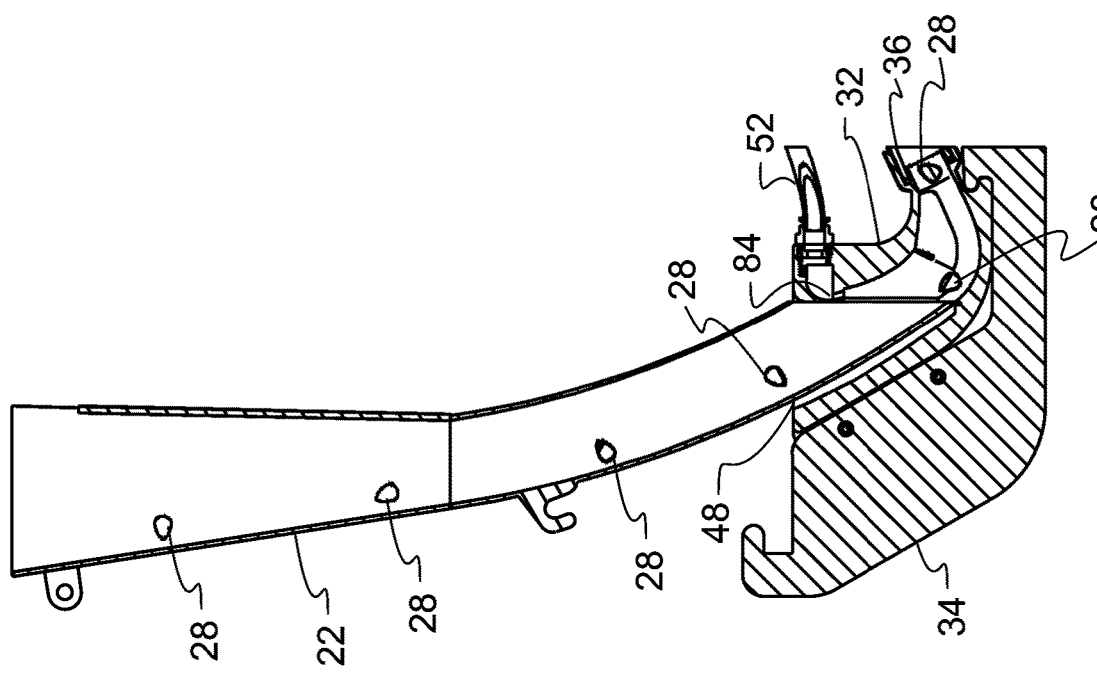
FIG. 4 is a cross-sectional view of the seed collector used in the first embodiment of the seed orientation system.

FIG. 4 depicts the intersection between the seed tube 22 and seed transfer tube 36. The seed tube 22 is inserted through seed entrance aperture 48. Air line connection 52 is operably connected to an air blade nozzle 84 which directs air toward the seeds. Air blade nozzle 84 propels the seeds into the seed transfer tube 36. Seeds exiting the seed tube 22 are in a random orientation with a high rotational energy as they have fallen from the seed meter 13 without any attempt at orientation.

Figure 7:
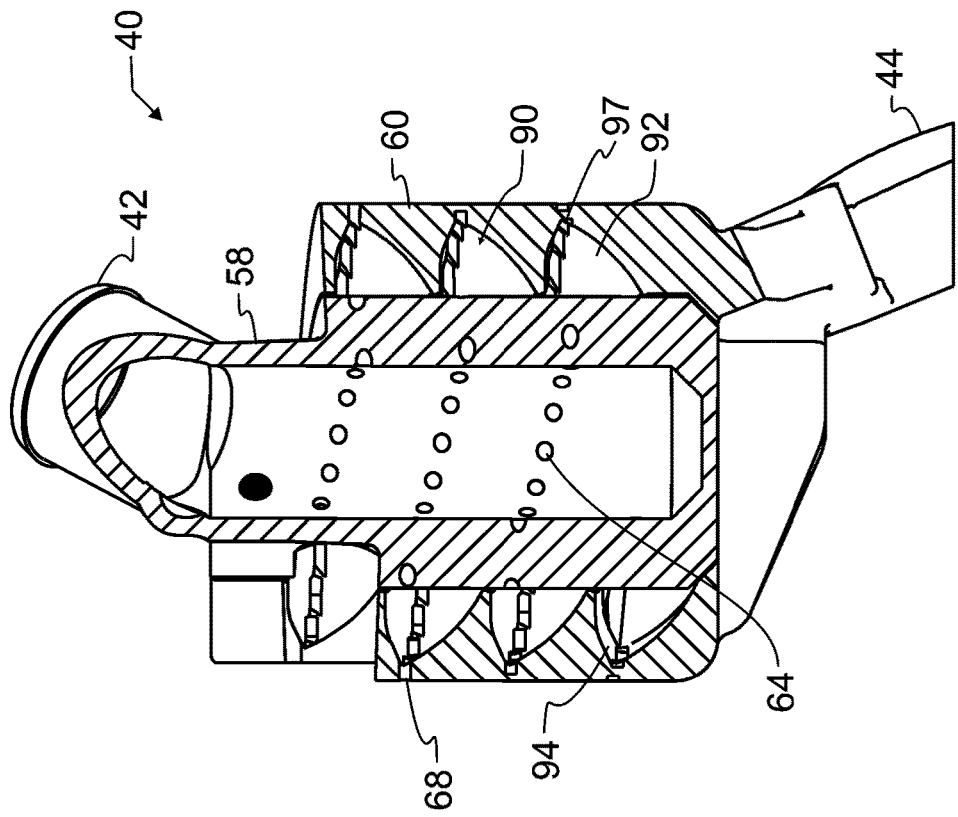
FIG. 7 is a cross sectional view of the seed orientation coil assembly used in the first embodiment of the seed orientation system.
Figure 6A:
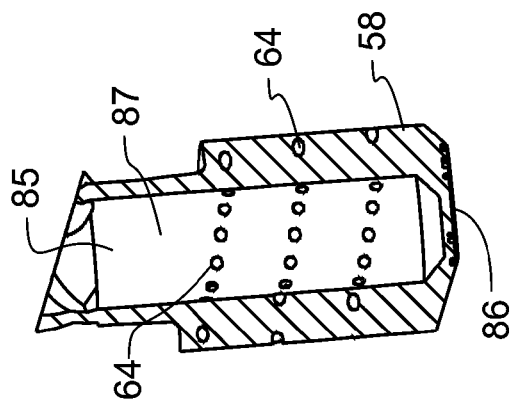
FIG. 6A is a cross-sectional view of an injector core taken along section line 6A' of FIG. 5.
Figure 6B:
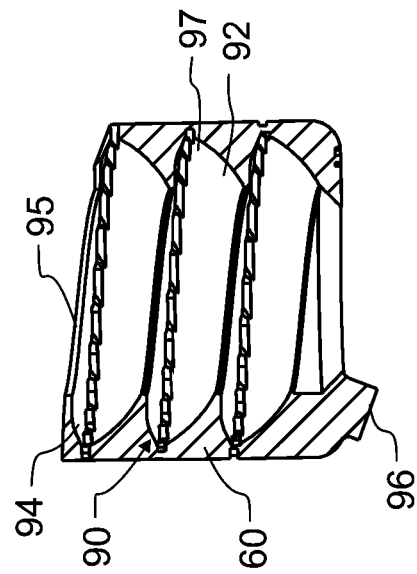
FIG. 6B is a cross-sectional view of a vented outer coil taken along section line 6B' of FIG. 5.
Figure 5:
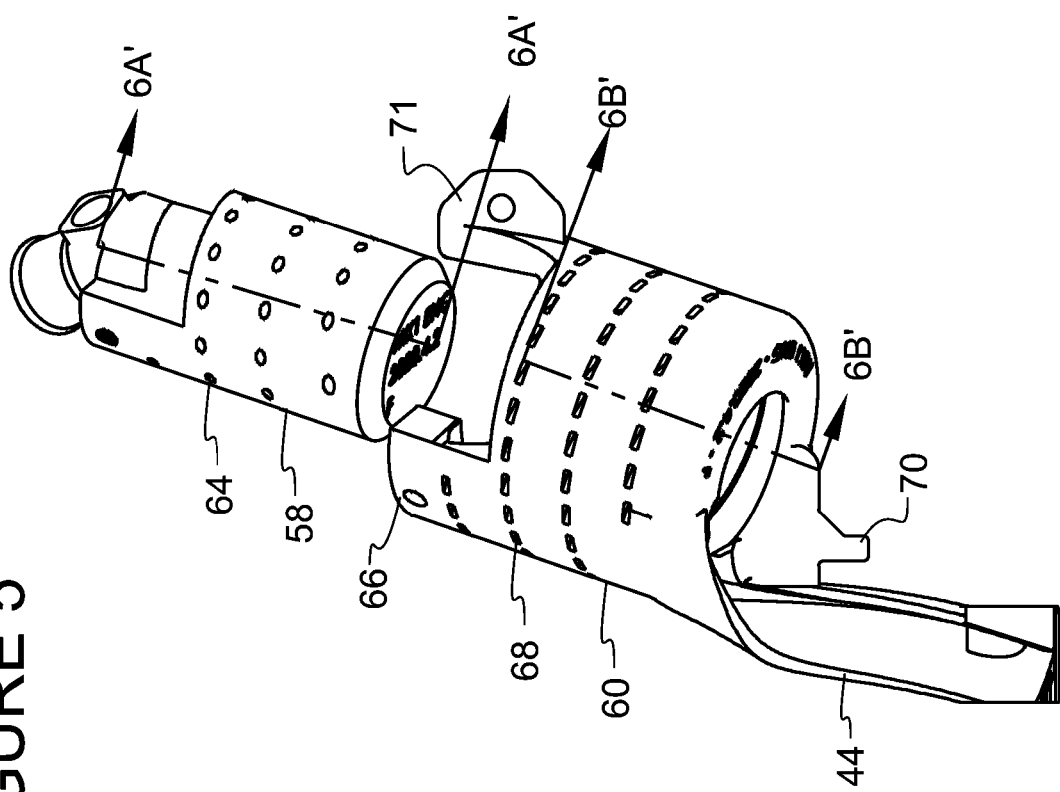
FIG. 5 is an exploded perspective view of the seed orientation coil assembly use in the first embodiment of the seed orientation system.

FIGS. 5 through 7 depict a first embodiment of the seed orientation coil assembly 40 in which the random position of the seed is changed to an oriented tip down position. FIG. 5 illustrates an exploded view of the seed orientation coil assembly 40. FIG. 6A is a cross sectional view of the injector core 58 taken at section line 6A' in FIG. 5. FIG. 6B is a cross sectional view of the vented outer coil 60 taken at section line 6B' in FIG. 5. Injector core 58 is nested within vented outer coil 60. The vented outer coil 60 is attached to the seed orientation support structure 34 at flange 70 and mounting point 71.

The injector core 58 is generally cylindrical in shape with an air aperture 85 at a first end and a closed aft end 86. A plurality of nozzles 64 are shown in a helical pattern creating air passages between the central aperture 87 of the injector core and the vented outer coil 60.

The vented outer coil 60 is generally cylindrical in shape with an open central aperture for insertion of the injector core 58. The exterior wall of the vented outer coil 60 includes a plurality of vents 68 that create air passages. The vented outer coil 60 further includes seed entrance 66 that opens to helical pathway 90.

FIG. 6B illustrates the helical pathway 90 of the vented outer coil 60. Helical pathway 90 includes seed riding surface 92 that intersects with seed guide wall 94. The seed riding surface 92 is curved so as to have a tighter or smaller radius towards the aft end 96 and a wider radius at the seed entrance end 95. The seed guide wall 94 intersects the seed riding surface 92 at ninety degrees to form a seed riding path 97. The plurality of vents 68 are generally disposed at the level of the seed riding path 97 on the seed riding surface 92. In a first embodiment the helical pathway 90 completes three revolutions about the injector core 58.

FIG. 7 illustrates the cross-sectional view when the injector core 58 is disposed within the vented outer coil 60. In a first embodiment, the outer wall of the injector coil 58 forms the inner barrier for the helical pathway 90. As such, the vented outer coil 60 does not require an inner wall or barrier. The helical pathway 90 terminates at the seed exit path 44. The curvature of the helical pathway 90 is changed as it transitions to the seed exit path 44 so the flat of the corn seed stays firmly positioned against the exit wall. The direction change of the path also separates the somewhat chaotic airflow of the injector nozzles and leaves only a nice laminar flow that helps the seed retain its ordered state of sliding flat on the smooth path surface, tip forward.

Figure 9:
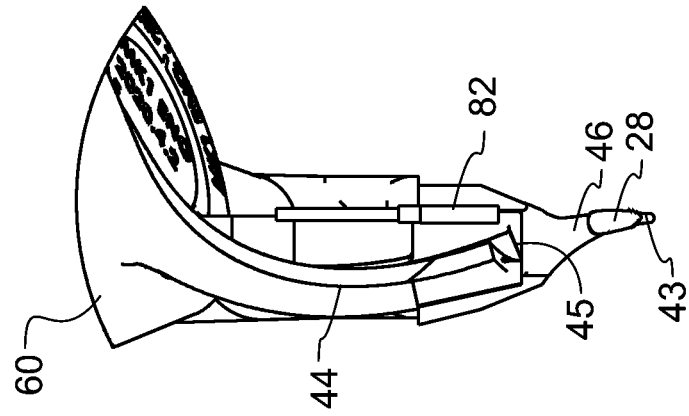
FIG. 9 is a detail view of the seed orientation system from FIG. 8.
Figure 8:
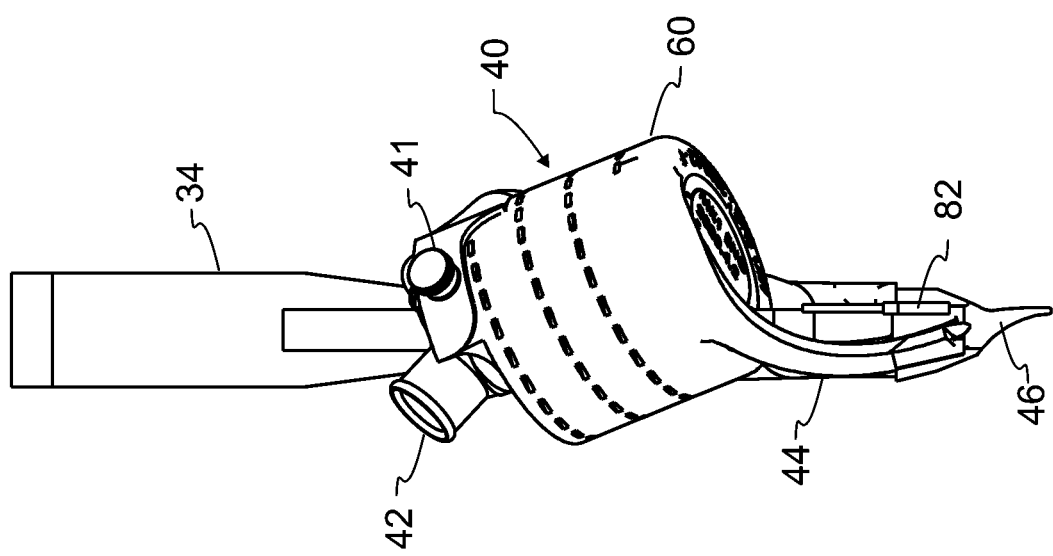
FIG. 8 is a rear elevational view of the seed orientation system.

FIGS. 8 and 9 illustrate the seed orientation exit path 44 and sub-furrow opener 46 which are part of the seed orientation coil assembly 40. The seed orientation exit path 44 is a continuation of the helical pathway 90. The seed sensor 82 is disposed proximal to the seed exit point 45. The purpose of the seed sensor 82 is to make sure the row unit 10 is actually planting seeds and, if not, to alert the person in the tractor that the row isn't planting because either the seed ran out in hopper or seed is plugged in the seed tube.

As depicted in FIG. 3, the sub furrow opener 46 may define an exit path aperture 47 that holds the exit path 44 and a support structure aperture 49 that allows for mounting the sub-furrow opener 46 to the seed orientation support structure 34. The sub-furrow opener 46 also features an extended bottom slot or extension 43 that shapes the sub-furrow to prevent the seed tip from hitting the bottom of the sub-furrow and recoiling out, losing its orientation. The seed sensor 82 is operably connected to the structure of the sub-furrow opener 46. The exit path 44 is also swept backward to help reduce the horizontal velocity delta of the seed versus the ground that the seed is coming into contact with.

As the seed leaves the exit path 44 it will be airborne for a short distance, maintaining its stable state. The exit path 44 aims the seed at a sub-furrow created by a sub-furrow opener 46. The sub-furrow opener 46 shapes walls into the soil that come into contact with the flat sides of the seed, wedging the seed into the soil, retaining its orientation.

The sub-furrow opener 46 also has a blade 51 that is swept back. This is to prevent clogs from soil entering up into the seed path when the planter is initially setting down into the soil. This can be achieved because the seed is shot backward at an angle, missing contact with blade 51. This swept back blade 51 also helps keep the sub-furrow walls from collapsing prematurely in loose soils. Collapsed walls would result in the seed bouncing, losing its orientation.

FIGS. 10 and 11 illustrate an alternate seed collector design wherein the existing seed tube 22 is removed and the seed orientation system 130 is directly connected to the seed meter. The seed orientation system 130 is mounted to the row unit 100. Seed orientation system 130 includes a seed collector 132 operably attached to the seed meter 13. The seed collector 132 gathers the seed and changes its direction by way of a seed transfer tube 136 to a seed orientation coil assembly 140. The seed passes through the helical path of the seed orientation coil assembly 140 to an oriented seed exit path 144. A sub-furrow opener 146 creates a wedge-shaped trough within the furrow for capturing the oriented seed. The opener blade 18 creates a furrow 150 and the sub-furrow opener 146 creates a trough 151 within the furrow 150.

Movement of the seed throughout the seed orientation system 130 is aided by air from a central blower/fan. Air is first directed to system air infeed 142 disposed on the upper face of the seed orientation coil assembly 140. An air line 138 is then directed to seed collector 132 for moving the seed from the seed collector 132 to the seed orientation coil assembly 140. The seed collector 132 catches seeds directly from the seed meter 13 and gently transports the seed under air power in the most direct and efficient path possible to the seed orientation coil assembly 140. This configuration improves seed spacing and minimizes seed tumbling. A seed orientation support structure 134 provides the structural support for the seed orientation coil assembly 140 and the sub-furrow opener 146.

In operation, the seed orientation system 130 delivers seeds from a row unit 10 to the ground in an optimal growing orientation. Seeds are placed in seed hopper 12. The seed hopper 12 includes an opening to direct the seed to a seed meter 13. The seed meter 13 then attempts to singulate the seed and spaces the seed out for delivery into the ground. The seed orientation system 130 either collects the seed from the seed tube 22 or from a seed collector 132 that replaces the seed tube 22.

A high-flow pressurized air system propels the seed to from the seed collector 32, 132 through a seed transfer tube 36, 136 to the seed orientation coil assembly 40. A major factor in seed stability is catching/collecting the seed as gently as possible from the seed meter. The seed ideally slides gently vs. tumbling into the orientation coil. This may be achieved by a very gentle and gradual collector path 132 from the meter to the coil to reduce acute angle impacts resulting in tumbling. A tumbling seed entering the orientation coil can result in tumbling through the entire coil as the air jets will just add to the disordered energy of the tumbling seed instead of stabilizing it.

The seed enters into a vented outer coil 60 of the seed orientation coil assembly 40, said vented outer coil 60 defining a helical pathway 90 to a seed exit path 44. The vented outer coil 60 includes a plurality of air vents 68 disposed radially about an outer wall of the vented outer coil 60.

Pressurized air is injected into the injector core 58 of the seed orientation coil assembly 40. The injector core includes a plurality of air injectors or nozzles 64 disposed radially about the outer wall of the injector core 58. The nozzles 64 direct a focused air stream across the helical pathway 90 of the vented outer coil 60. It is envisioned that the nozzles may be aligned with air vents 68.

Figure 12:
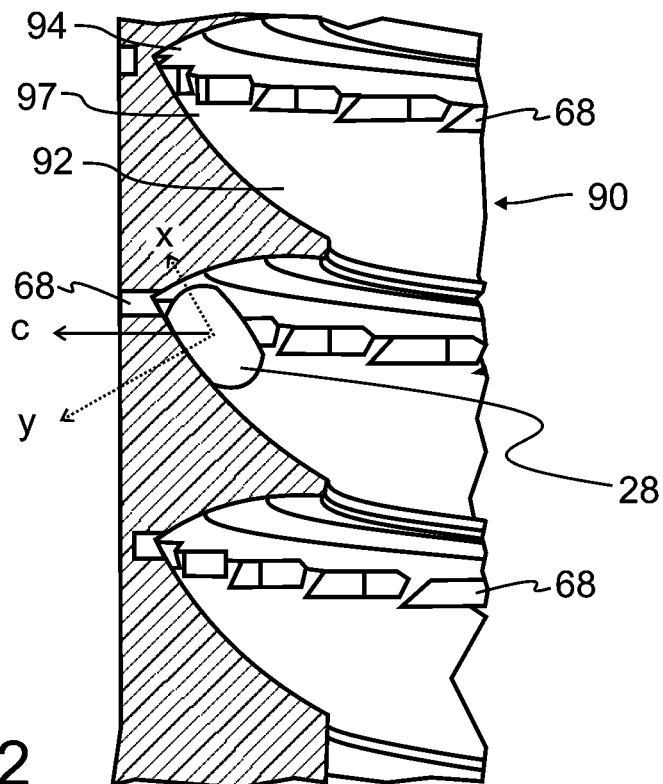
FIG. 12 is a cross-sectional view of the vented outer coil illustrating the position of a seed and the representative centrifugal forces on the seed.
Figure 13:
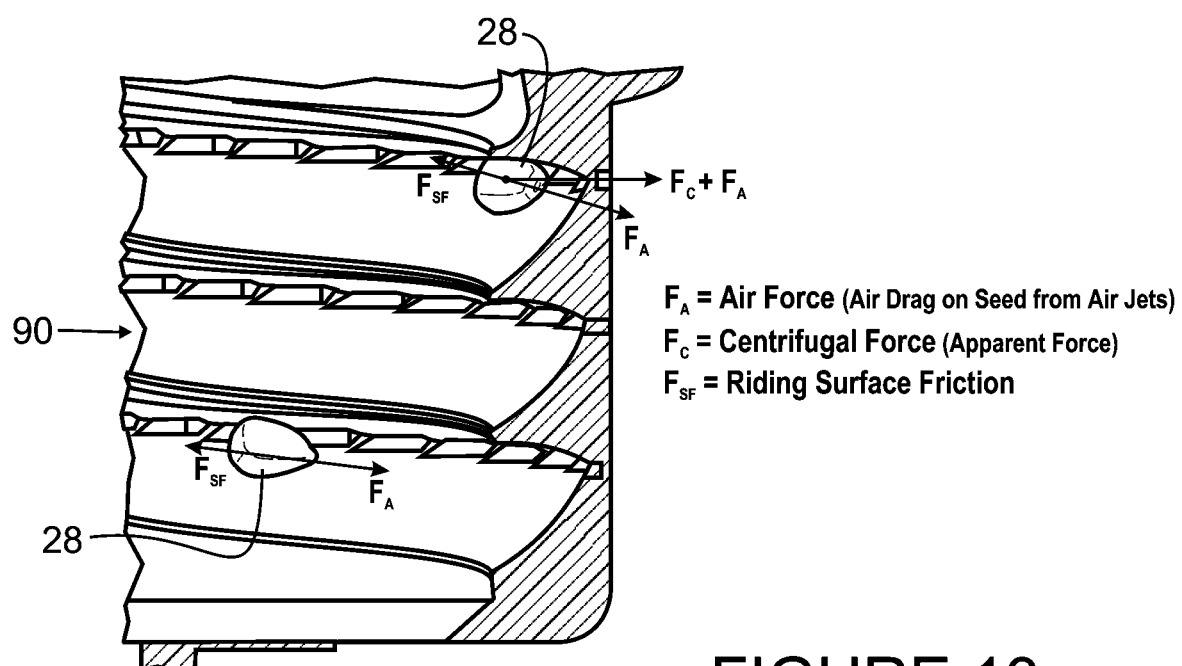
FIG. 13 is a cross-sectional view of the vented outer coil illustrating the position of seeds and the representative aerodynamic forces.

The seed enters the helical pathway 90 in a random position. As illustrated in FIGS. 12 and 13, a centrifugal force is induced on the seed as it travels its curved/helical pathway 90. The airflow from the injector nozzles 64 hit the seed at an angle, giving two main (pressure) force vector components on the seed. One component pushes parallel to the seed path and the other pushes perpendicular to the seed path. The parallel component of the airflow flows from behind the seed and over the seed, this both propels the seed forward and causes the seed to orient tip forward in the flow (as this orientation has the lowest stable aerodynamic cross section (lowest drag)). This parallel airflow component also increases the velocity of the seed which makes soil capture possible. The parallel airflow may be a combination of the airflow generated by the seed meter 13 and the air flow directed to the seed transfer tube 36. The perpendicular component of the airflow, combined with centrifugal force, pushes the seed into the seed riding surface 92 and seed guide wall 94 to provide the stability needed to maintain the tip-forward orientation.

After the seed is oriented it is necessary to stabilize the position of the seed all the way to the ground. It is easy to orient a seed for a few seconds but due to the shape of the seed there is a tendency for the seed to tumble out of control. Keeping the seed stable after orientation requires a combination of techniques. In order to a maintain position of the seed, a low friction surface for the helical path 90 is preferred. A low friction, low roughness and/or lubricious surface reduces any tumbling of the seed as the seed will not "dig in" or "catch" on the surface and instead will induce the seed to slide, maintaining an oriented position. An energy absorbing surface is also beneficial for it will "deaden" seed impact energy from tumbling and allow the seed to ride vs. rolling and/or tumbling and help maintain an oriented position. The path from the seed meter 13 to the orientation coil 40 also benefits from the properties listed above for the helical pathway 90.

A curved path also acts to maintain the seed orientation through a centrifugal force. The centrifugal force acts on the seed, to drive the seed into the surface to stabilize and reduce bouncing, tumbling and to help retain an oriented position. In addition to the helical pathway 90, a riding surface 92 shape/profile that has a guide wall 94 helps to precisely locate, stabilize, and maintain the orientation of an oriented seed. The curved shape of the riding surface 92 will also help align the seed longitudinally along the seed path which aids in the orientation process.

The seed is then directed to the seed exit path 44 and then into a scored sub-furrow inside a main furrow that is used to capture or wedge the seed to retain its orientation and/or position. The seed orientation can be captured/preserved if the seed is propelled into an interference fit sub-furrow in the soil that the seed wedges into. The sub-furrow profile preferably needs to taper down to allow seeds of all sizes to be captured. The profile should also have an extended bottom to prevent the seed tip from hitting the bottom of the sub-furrow and recoiling out before becoming wedge/taper locked.

The seed orientation coil assembly 40 is angled relative to the normal with the ground to help reduce the seed/ground velocity delta. At a typical 5 mph planting speed and what would be a 5 mph horizontal velocity delta, the angled coil should reduce the velocity delta to about 2 mph. At a slower 3 mph planting speed, the seed would be a dead drop into the sub-furrow.

The terminology used herein is for the purpose of describing particular embodiments only and is not intended to be limiting of the invention. As used herein, the term "and/or" includes any and all combinations of one or more of the associated listed items. As used herein, the singular forms "a,", "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence of or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The invention claimed is:

1. A method of planting seed in an oriented position with a planter row unit traveling in a forward direction of travel, the method comprising:
   with a furrow opener disposed on the planter row unit, forming a furrow in a soil surface as the planter row unit travels in a forward direction of travel;

collecting the seed in a seed collector from a seed source;

delivering pressurized air into the seed collector to propel the seed from the seed collector into a seed orientation coil assembly, the seed orientation coil assembly defining a curved pathway toward a seed exit path;

with a sub-furrow opener, scoring a wedge-shaped sub-furrow within the previously formed furrow adjacent to the seed exit path;

delivering pressurized air into the seed orientation coil assembly, at least a portion of the pressurized air delivered into the seed orientation coil assembly includes a parallel air flow component directed parallel to the curved pathway, the parallel air flow component propelling the seed toward the seed exit path, whereupon the seed exits through said seed exit path and is captured within the wedge-shaped sub-furrow.

2. The method of claim 1, wherein the curved pathway includes a seed riding surface, wherein the seed engages with the seed riding surface as the seed is propelled along the curved pathway toward the seed exit path.

3. The method of claim 2, wherein the curved pathway further includes a seed guide wall that adjoins to the seed riding surface, and wherein the seed engages with the seed guide wall as the seed is propelled along the curved pathway toward the seed exit path.

4. The method of claim 3, wherein the pressurized air delivered into the seed orientation coil assembly includes a transverse air flow component directed transverse to the curved pathway, wherein the transverse air flow component assists in forcing the seed radially outward in engagement with the seed guide wall.

5. The method of claim 4, wherein the curved pathway of the seed orientation coil assembly is defined by an outer coil with a central aperture in which an injector core is disposed, wherein the injector core includes nozzles delivering the parallel air flow component and the transverse air flow component into the curved pathway.

6. The method of claim 1, wherein an outer wall of the curved pathway includes vents, the vents venting at least some of the pressurized air delivered into the seed orientation coil assembly.

7. The method of claim 1, wherein, as the seed is propelled along the curved pathway, the seed is oriented such that, upon exiting through the seed exit path, a tip of the seed is oriented down toward the wedge-shaped sub-furrow and the seed is captured within the wedge-shaped sub-furrow tip-down.

8. The method of claim 1, wherein the seed collector includes:
- a housing having a seed entrance aperture and a seed exit aperture, wherein the seed entrance aperture is sized to mate with a seed tube on the planter row unit, the seed tube receiving the seed from a seed meter on the planter row unit;
- a seed transfer tube connected between the seed exit aperture and the seed orientation coil assembly, the seed transfer tube communicating the seed from the seed collector to the seed orientation coil assembly.

9. The method of claim 1, wherein the seed collector includes:
- a seed transfer tube disposed to receive the seed from a seed meter on the planter row unit.

* * * * *